United States Patent
Hiyoshi

(10) Patent No.: US 10,378,629 B2
(45) Date of Patent: Aug. 13, 2019

(54) POWER SYSTEM

(71) Applicant: HONDA MOTOR CO., LTD., Tokyo (JP)

(72) Inventor: Toshio Hiyoshi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 15/824,220

(22) Filed: Nov. 28, 2017

(65) Prior Publication Data
US 2018/0180150 A1   Jun. 28, 2018

(30) Foreign Application Priority Data
Dec. 22, 2016 (JP) ................. 2016-249813

(51) Int. Cl.
| | |
|---|---|
| *B60T 1/00* | (2006.01) |
| *F16H 37/08* | (2006.01) |
| *F16H 63/34* | (2006.01) |
| *F16H 48/08* | (2006.01) |
| *F16D 63/00* | (2006.01) |
| *B60K 1/00* | (2006.01) |
| *F16H 48/40* | (2012.01) |
| *F16H 1/20* | (2006.01) |

(52) U.S. Cl.
CPC ........... *F16H 37/0813* (2013.01); *B60K 1/00* (2013.01); *B60T 1/005* (2013.01); *F16D 63/006* (2013.01); *F16H 48/08* (2013.01); *F16H 63/3416* (2013.01); *B60K 2001/001* (2013.01); *F16H 1/20* (2013.01); *F16H 48/40* (2013.01)

(58) Field of Classification Search
CPC ...... F16H 37/0813; F16H 48/08; F16H 48/40; F16H 63/34; F16H 63/3416; B60T 1/005; F16D 63/006
USPC ...................................... 475/5, 230
See application file for complete search history.

(56) References Cited

U.S. PATENT DOCUMENTS

| | | | | |
|---|---|---|---|---|
| 4,369,867 A | * | 1/1983 | Lemieux ................. | B60T 1/005 188/31 |
| 4,418,777 A | * | 12/1983 | Stockton ............. | F16H 57/0413 180/65.6 |
| 5,372,213 A | * | 12/1994 | Hasebe .................... | B60K 1/02 180/65.6 |

(Continued)

FOREIGN PATENT DOCUMENTS

JP   H05-278483 A   10/1993

*Primary Examiner* — Leslie A Nicholson, III
(74) *Attorney, Agent, or Firm* — Paratus Law Group, PLLC

(57) ABSTRACT

A power system includes an electric motor, a transmission, and a differential gear system. The transmission includes a first gear that is mechanically connected to the electric motor, a second gear that has a rotation axis in common with the first gear and is mechanically connected to a differential gear casing of the differential gear system, and a plurality of pinion gears that mesh with the first gear and the second gear. The plurality of pinion gears are supported to be capable of rotating and not to be capable of revolving. One pinion gear out of the plurality of pinion gears is only mechanically connected to a rotation restricting mechanism that is switchable between an operating state and a non-operating state. The rotation restricting mechanism restricts rotation of the pinion gear in the operating state, and permits the rotation of the pinion gear in the non-operating state.

5 Claims, 3 Drawing Sheets

(56) References Cited

U.S. PATENT DOCUMENTS

| | | | | |
|---|---|---|---|---|
| 5,396,968 | A | | 3/1995 | Hasebe et al. |
| 5,419,406 | A | * | 5/1995 | Kawamoto ............... B60K 1/02 180/65.6 |
| 5,533,943 | A | * | 7/1996 | Ichioka .................... F16H 1/28 475/198 |
| 5,718,302 | A | * | 2/1998 | Hasebe ................... B60K 1/00 180/60 |
| 5,743,348 | A | * | 4/1998 | Coppola ................. B60K 1/00 180/65.6 |
| 5,943,918 | A | * | 8/1999 | Reed, Jr. ................. B60K 6/36 74/661 |
| 6,692,394 | B2 | * | 2/2004 | Takenaka ................ B60K 6/36 180/65.6 |
| 7,549,940 | B2 | * | 6/2009 | Kira ........................ B60K 6/36 475/204 |
| 7,980,343 | B2 | * | 7/2011 | Mogi ..................... B60K 17/12 180/65.6 |
| 8,479,851 | B2 | * | 7/2013 | Mack ..................... H02K 7/003 180/65.1 |
| 8,556,760 | B2 | * | 10/2013 | Mack ...................... B60K 1/00 475/152 |
| 8,727,928 | B2 | * | 5/2014 | Harashima ............... B60K 1/00 180/65.31 |
| 8,840,499 | B2 | * | 9/2014 | Buffet .................... B60K 6/105 475/151 |
| 8,888,636 | B2 | * | 11/2014 | Ikegami ................ B60K 6/365 475/207 |
| 8,917,000 | B2 | * | 12/2014 | Yazaki ................... H02K 5/225 310/71 |
| 9,303,745 | B2 | * | 4/2016 | Wenthen ................ B60K 1/00 |
| 9,353,859 | B2 | * | 5/2016 | Larsson ............. F16H 63/3433 |
| 9,689,481 | B2 | * | 6/2017 | Mellet ................... F16H 37/022 |
| 9,765,826 | B2 | * | 9/2017 | Nishimoto ........... B60K 17/344 |

* cited by examiner

POWER SYSTEM

CROSS-REFERENCE TO RELATED APPLICATION (S)

This application claims priority from Japanese Patent Application No. 2016-249813 filed on Dec. 22, 2016, the entire contents of which are incorporated herein by reference.

FIELD

The present invention relates to a power system that is provided in an electric motor vehicle.

BACKGROUND

A power system is known (for example, JP-A-H05-278483) which includes an electric motor, a differential gear system that distributes output power of the electric motor to a left wheel and a right wheel, and a parking mechanism (rotation restricting mechanism) that is disposed on power transmission paths between the electric motor and the left wheel and the electric motor and the right wheel. This type of power system is provided as a front wheel drive system or a rear wheel drive system in an electric motor vehicle such as a hybrid vehicle or an electric vehicle, and it is desired to reduce size and weight while maintaining an appropriate power transmission function.

In the power system disclosed in JP-A-H05-278483, however, since a parking gear is provided in the differential gear casing of the differential gear system, there are problems that the parking mechanism makes a force for maintaining wheels, that is, a vehicle large in a stop state and the parking mechanism increases in size.

The invention is to provide a power system in which a rotation restricting mechanism can make a force for maintaining wheels small in a stop state and the rotation restricting mechanism can be reduced in size.

The invention provides following aspects (1) to (5).

(1) A power system (e.g., a power system 1 in an embodiment) including:

an electric motor (e.g., an electric motor 2 in an embodiment) that drives a left wheel and a right wheel of a vehicle;

a transmission (e.g., a transmission 5 in an embodiment) that is disposed on power transmission paths between the electric motor and the left wheel (e.g., a left wheel LW in an embodiment) and between the electric motor and the right wheel (e.g., a right wheel RW in an embodiment); and a differential gear system (e.g., a differential gear system 6 in an embodiment) that distributes output power shifted by the transmission to the left wheel and the right wheel, wherein:

the transmission includes a first gear (e.g., a first gear 51 in an embodiment) that is mechanically connected to the electric motor, a second gear (e.g., a second gear 52 in an embodiment) that has a rotation axis in common with the first gear and is mechanically connected to a differential gear casing (e.g., a differential gear casing 61 in an embodiment) of the differential gear system, and a plurality of pinion gears (e.g., pinion gears 53 in an embodiment) that mesh with the first gear and the second gear;

the plurality of pinion gears are supported to be capable of rotating and not to be capable of revolving;

one pinion gear out of the plurality of pinion gears is only mechanically connected to a rotation restricting mechanism (e.g., a rotation restricting mechanism 70 to be described below) that is switchable between an operating state and a non-operating state; and the rotation restricting mechanism restricts rotation of the pinion gear in the operating state, and permits the rotation of the pinion gear in the non-operating state.

(2) The power system according to (1), wherein the one pinion gear is located at an uppermost position out of the plurality of pinion gears.

(3) The power system according to (1) or (2), wherein the pinion gear includes a large diameter gear (e.g., a large diameter gear 53a in an embodiment) and a small diameter gear (e.g., a small diameter gear 53b in an embodiment), and the small diameter gear meshes with the second gear.

(4) The power system according to (3), wherein the large diameter gear of the one pinion gear has a parking gear (e.g., a parking gear 53d to be described below) engaged with the rotation restricting mechanism.

(5) The power system according to any one of (1) to (4), wherein an actuator (e.g., an actuator 73 to be described below) for driving the rotation restricting mechanism is provided on an outer periphery of the differential gear casing of the differential gear system.

According to aspect (1), since the plurality of pinion gears only rotate without revolving, the operation of the entire power system can be stopped when only one of the pinion gears is connected to the rotation restricting mechanism.

In addition, since the rotation restricting mechanism is mechanically connected to the pinion gear, the force for maintaining the wheel, that is, the vehicle in the stop state can be small as compared with a case where the rotation restricting mechanism is connected to the differential gear casing of the differential gear system, and thus the actuator for driving the rotation restricting mechanism can also be reduced in size.

According to aspect (2), since the rotation restricting mechanism is mechanically connected to the one pinion gear located uppermost out of the plurality of pinion gears, it is possible to prevent intrusion of water into the actuator for driving the rotation restricting mechanism.

According to aspect (3), since the pinion gear includes the large diameter gear and the small diameter gear and the small diameter gear meshes with the second gear, enlargement in dimension in the radial direction can be prevented.

According to aspect (4), since the parking gear engaging with the rotation restricting mechanism is provided on the large diameter gear of the one pinion gear, the space of the outer periphery of the small diameter gear can be effectively utilized.

According to aspect (5), since the actuator for driving the rotation restricting mechanism is provided on the outer periphery of the differential gear casing of the differential gear system, the space of the outer periphery of the differential gear casing of the differential gear system can be effectively utilized.

DETAILED DESCRIPTION

A power system 1 according to an embodiment of the invention will be described with reference to FIGS. 1 to 3.

The power system 1 of the embodiment includes an electric motor 2 that is a drive source for driving axles, and is provided in an electric motor vehicle such as a hybrid vehicle or an electric vehicle as a front wheel drive system or a rear wheel drive system.

[Power System]

Figure 1:
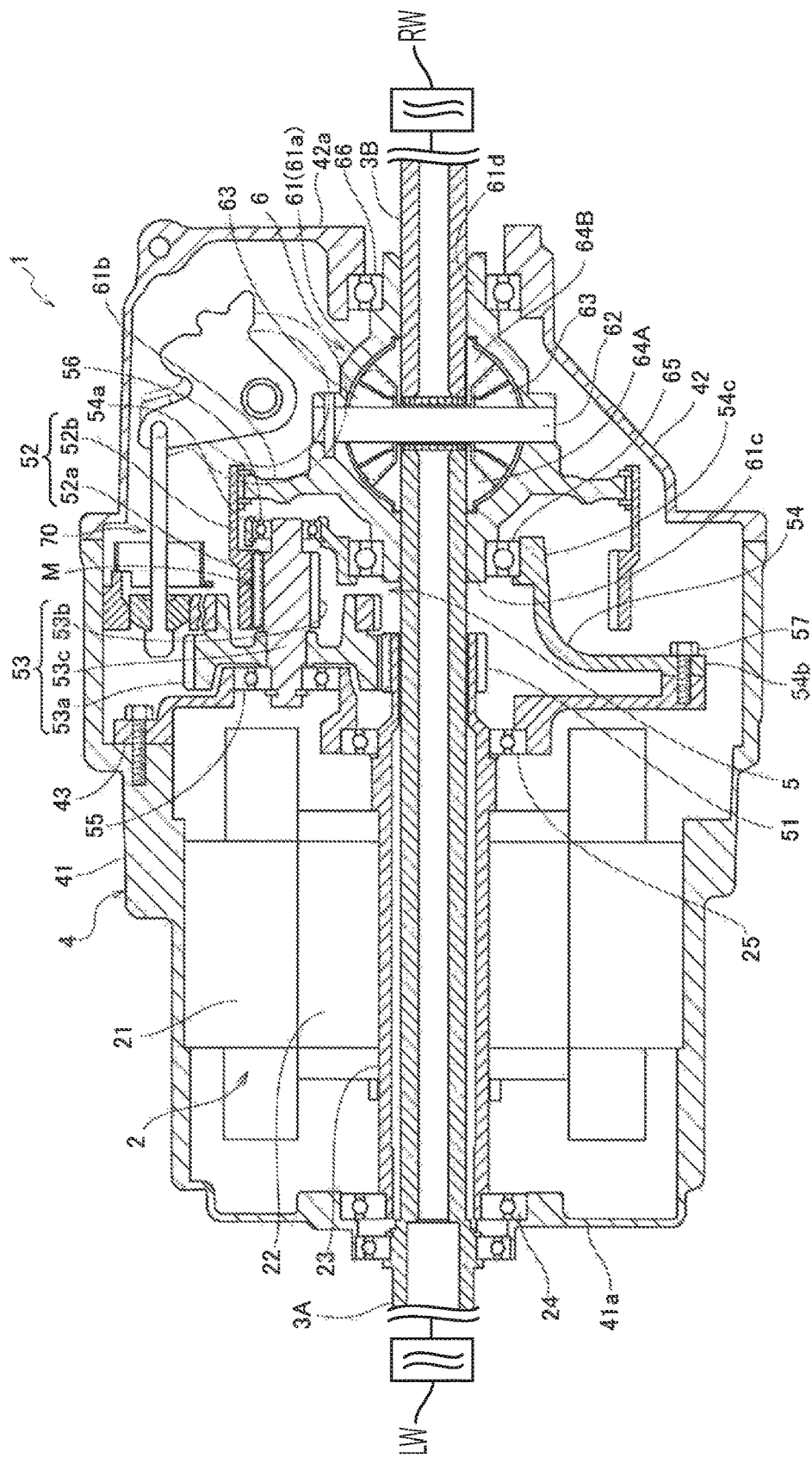
FIG. 1 is a sectional view of a power system according to an embodiment of the invention.

In FIG. 1, reference numerals 3A and 3B indicate left and right axles, which are coaxially disposed in a vehicle width direction. In the power system 1, a housing 4 has the entire shape formed into a substantially cylindrical shape, and includes therein the electric motor 2 for driving the axles, a transmission 5 that decelerates driving rotation of the electric motor 2, and a differential gear system 6 that distributes the driving rotation decelerated by the transmission 5 to the axles 3A and 3B.

The housing 4 includes a first casing 41 for accommodating the electric motor 2 and a second casing 42 for accommodating the transmission 5 and the differential gear system 6. A partition wall 43 is provided at a boundary between the first casing 41 and the second casing 42, and an internal space of the first casing 41 is partitioned from an internal space of the second casing 42 by the partition wall 43.

[Electric Motor]

The electric motor 2 includes the stator 21 fixed to an inner peripheral part of the first casing 41 and the rotor 22 disposed rotatably on the inner periphery of the stator 21. A rotor shaft 23 is coupled to an inner peripheral part of the rotor 22 so as to surround an outer periphery of one axle 3A, and the rotor shaft 23 is supported on an end wall 41a of the first casing 41 and the partition wall 43 through bearings 24 and 25 so as to be relatively rotatable coaxially with the axle 3A. In addition, one end of the axle 3A and the rotor shaft 23 penetrates the partition wall 43 and extends into the second casing 42, and the other end of the axle 3A penetrates the end wall 41a of the first casing 41 and extends to the outside of the housing 4.

[Transmission]

The transmission 5 includes a first gear 51 mechanically connected to the electric motor 2, a second gear 52 having the same rotation axis as that of the first gear 51 and mechanically connected to a differential gear casing 61 of the differential gear system 6, a plurality of pinion gears 53 meshing with the first gear 51 and the second gear 52, and a pinion holder 54 for supporting the plurality of pinion gears 53 to be rotatable and not to revolve, and the decelerated driving rotation is output to the differential gear casing 61 of the differential gear system 6 through the pinion gear 53 and the second gear 52 when the driving rotation of the electric motor 2 is input from the first gear 51.

The first gear 51 is an external gear, and is formed integrally with the rotor shaft 23. The pinion gear 53 includes a large diameter gear 53a which is an external gear, a small diameter gear 53b which is an external gear, and a pinion shaft 53c which supports the large diameter gear 53a and the small diameter gear 53b in an integrally rotatable manner. The large diameter gear 53a is coupled to the pinion shaft 53c on a side of the electric motor 2, and meshes with the first gear 51. In addition, the large diameter gear 53a is provided with a parking gear 53d (to be described below) on the side of the differential gear system 6. The small diameter gear 53b is formed integrally with the pinion shaft 53c on a side of the differential gear system 6, and meshes with the second gear 52. An end of the pinion shaft 53c on the side of the electric motor 2 is rotatably supported on the partition wall 43 through the bearing 55, and the other end thereof on the side of the differential gear system 6 is rotatably supported on a pinion gear supporting portion 54a of the pinion holder 54 through the bearing 56.

Figure 3:
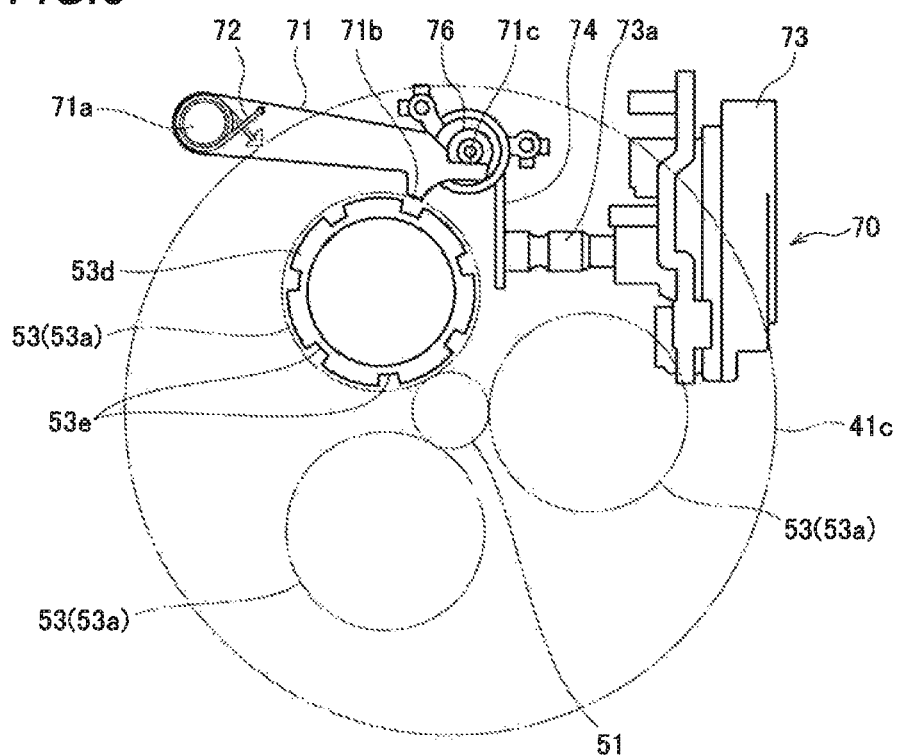
FIG. 3 is a side view of a rotation restricting mechanism and a pinion gear inside the power system when viewed from a side of a differential gear system.

As illustrated in FIG. 3, the transmission 5 of the embodiment includes three pinion gears 53. The three pinion gears 53 are disposed at equal intervals (intervals of 120°) in a circumferential direction around the first gear 51.

In the second gear 52, a gear portion 52a is an internal gear and meshes with the small diameter gear 53b of the pinion gear 53. The second gear 52 includes a connecting portion 52b extending from the gear portion 52a toward the differential gear system 6 across the outer peripheral side of the pinion holder 54 (pinion gear supporting portion 54a), and the connecting portion 52b is mechanically connected to the differential gear casing 61 of the differential gear system 6 through a connecting unit such as a spline.

The pinion holder 54 includes three pinion gear supporting portions 54a each of which rotatably supports the pinion shaft 53c of the pinion gear 53 through the bearing 56, three fixed portions 54b that are fixed to the partition wall 43, and a cylindrical portion 54c formed on a center (on an inner diameter side of the pinion gear supporting portion 54a and the fixed portion 54b) of the pinion holder 54.

The pinion gear supporting portion 54a is disposed on the side of the differential gear casing 61 of the differential gear system 6 relative to a meshing portion M between the second gear 52 mechanically connected to the differential gear casing 61 of the differential gear system 6 and the small diameter gear 53b of the pinion gear 53. Thus, the other end of the pinion shaft 53c, in which one end thereof is supported by the partition wall 43 through the bearing 55, is supported by the pinion gear supporting portion 54a through the bearing 56, and thus the pinion gear 53 can be appropriately supported in a state of being held at both sides.

The three fixed portions 54b are located at intermediate portions between the pinion gear supporting portions 54a adjacent to each other in the circumferential direction, and are fastened to the partition wall 43 with bolts 57, respectively. Thereby, the partition wall 43 serves as a support member of the pinion holder 54 as well as a support member of the pinion shaft 53c.

The cylindrical portion 54c rotatably supports one end side of the differential gear casing 61 through the bearing 65. Thereby, the pinion holder 54 serves as a support member of the differential gear casing 61 as well as a support member of the pinion gear 53.

[Differential Gear System]

The differential gear system 6 includes the differential gear casing 61, a differential pinion shaft 62, a differential pinion gear 63, and left and right side gears 64A and 64B so as to allow difference in rotation of the left and right axles 3A and 3B while distributing the driving rotation, which is input to the differential gear casing 61 from the second gear 52, to the left and right axles 3A and 3B.

The differential gear casing 61 includes a spherical differential gear casing body 61a that accommodates the differential pinion shaft 62, the differential pinion gear 63, and the left and right side gears 64A and 64B, an input plate 61b that extends in the radial direction from the outer periphery of the differential gear casing body 61a and is mechanically connected to the second gear 52, and left and right extension portions 61c and 61d that extend in the axial direction from both sides of the differential gear casing body 61a. One extension portion 61c rotatably supports the one axle 3A at an inner peripheral part thereof, and an outer peripheral part thereof is rotatably supported by the pinion holder 54 through the bearing 65. Further, the other extension portion 61d rotatably supports the other axle 3B at an inner peripheral part thereof, and an outer peripheral part thereof is rotatably supported by the end wall 42a of the second casing 42 through the bearing 66.

The differential pinion shaft 62 is supported by the differential gear casing body 61a so as to be directed in a direction orthogonal to the axles 3A and 3B, and rotatably supports two differential pinion gears 63, which are bevel gears, inside the differential gear casing body 61a. That is, the differential pinion shaft 62 allows the differential pinion gears 63 to rotate while revolving with the rotation of the differential gear casing 61.

The left and right side gears 64A and 64B are bevel gears, are rotatably supported inside the differential gear casing body 61a so as to mesh with the differential pinion gears 63 from both sides, and are mechanically connected to the left and right axles 3A and 3B through the connecting unit such as the spline. In a state where the differential pinion gears 63 revolve without rotating, for example, during straight running, the left and right side gears 64A and 64B rotate at a constant speed, and the driving rotation is transmitted to the left and right axles 3A and 3B. Furthermore, during curve running or left or right turning, the differential pinion gears 63 rotate, so that the left and right side gears 64A and 64B rotate relative to each other and the difference in rotation between the left and right axles 3A and 3B is allowed.

[Rotation Restricting Mechanism]

A rotation restricting mechanism 70 provided as a parking mechanism in the power system 1 will be described below with reference to FIGS. 1 to 3.

The rotation restricting mechanism 70 can be switched between an operating state and a non-operating state. During the operating state, the rotation restricting mechanism 70 is engaged with a parking gear 53d provided on the power transmission path of the power system 1 to restrict the rotation of the parking gear, thereby maintaining the wheel, that is, the vehicle in a stop state; and during the non-operating state it is configured to release the engagement with the parking gear 53d to permit the rotation thereof.

Figure 2:
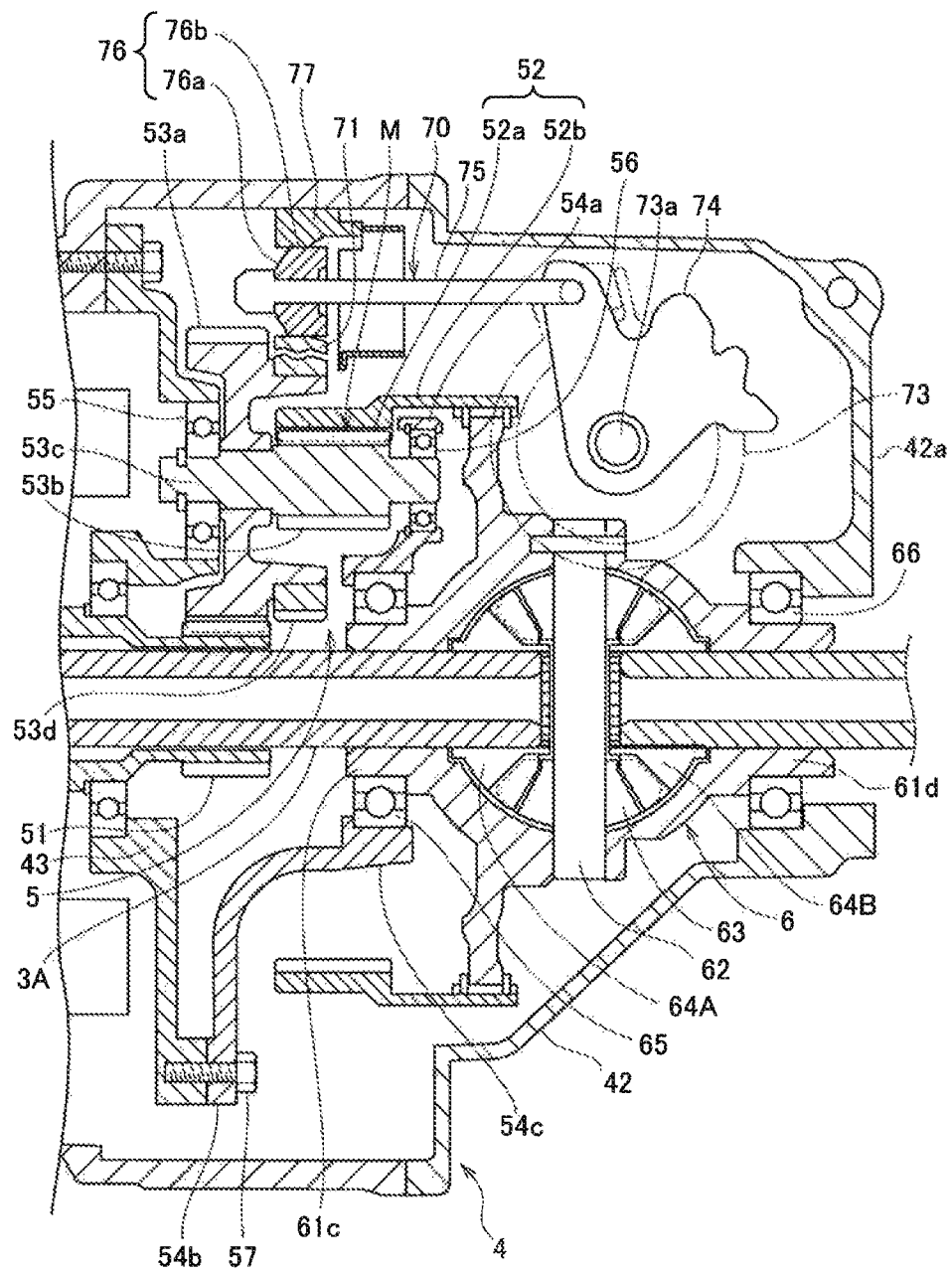
FIG. 2 is a partially enlarged sectional view of a main part of the power system illustrated in FIG. 1.

More specifically, as illustrated in FIGS. 2 and 3, the rotation restricting mechanism 70 of the embodiment includes a parking pawl 71 that is swingably supported by the housing 4 through a support shaft 71a and has an engaging claw 71b engageable with an engaging groove 53e of the parking gear 53d at a lower part of a fore-end thereof, a spring 72 for urging the parking pawl 71 in a non-engaging direction, an actuator 73 for driving the rotation restricting mechanism 70, an operating lever 74 that rotates integrally with an output shaft 73a of the actuator 73, a parking rod 75 that extends toward the parking pawl 71 from the operating lever 74 and moves forward and backward according to the rotation of the operating lever 74, a cam member 76 provided at a fore-end of the parking rod 75, and a stopper 77 that restricts the escape of the cam member 76 in an outer radial direction.

On the outer peripheral surface of the cam member 76, a conical cam surface 76a having a conical shape and becoming smaller in diameter toward the fore-end and a columnar cam surface 76b having a columnar shape and being continuous to a rear side thereof are formed. An abutting portion 71c is provided at an upper part of the fore-end of the parking pawl 71 to abut against the cam surfaces 76a and 76b of the cam member 76. When the parking rod 75 is in a state of moving backward, the cam member 76 does not abut against the abutting portion 71c of the parking pawl 71, so that the parking pawl 71 is maintained in a non-operating position where it is away from the parking gear 53d by an urging force of the spring 72. In this state, since the engaging claw 71b of the parking pawl 71 is not engaged with the engaging groove 53e of the parking gear 53d, the rotation of the parking gear 53d is permitted.

On the other hand, when the parking rod 75 moves forward as the actuator 73 drives, first, the conical cam surface 76a of the cam member 76 abuts against the abutting portion 71c of the parking pawl 71, and the abutting portion 71c of the parking pawl 71 is pushed toward the parking gear 53d as the parking rod 75 moves forward. Thus, the parking pawl 71 swings toward the parking gear 53d, and the engaging claw 71b provided at the fore-end is engaged with the engaging groove 53e of the parking gear 53d to restrict the rotation of the parking gear 53d. The cam member 76 reaches the position where the columnar cam surface 76b finally abuts against the abutting portion 71c of the parking pawl 71 as the parking rod 75 moves forward, the columnar cam surface 76b receives the force applied to the parking pawl 71 from the parking gear 53d, that is, the force for maintaining the wheels in a stop state, and the operating state of the parking pawl 71 is maintained.

The rotation restricting mechanism 70 includes a mechanism that holds the cam member 76 in the state of moving backward in a power storing state while permitting the parking rod 75 to move forward when the position of the engaging claw 71b of the parking pawl 71 does not coincide with that of the engaging groove 53e of the parking gear 53d and that allows the cam member 76 to move forward at a timing when the position of the engaging claw 71b of the parking pawl 71 coincides with that of the engaging groove 53e of the parking gear 53d such that the engaging claw 71b of the parking pawl 71 is engaged with the engaging groove 53e of the parking gear 53d, but the illustration and detailed description thereof will not be presented.

The rotation restricting mechanism 70 configured as described above is mechanically connected to one pinion gear 53 out of the plurality of pinion gears 53 constituting the transmission 5, thereby restricting the rotation of the pinion gear 53 in the operating state and permitting the rotation of the pinion gear 53 in the non-operating state. That is, since the plurality of pinion gears 53 only rotate without revolving, the operation of the entire power system 1 can be stopped when only one of the pinion gears 53 is connected to the rotation restricting mechanism 70. In addition, as compared with a case where the rotation restricting mechanism 70 is connected to the differential gear casing 61 of the differential gear system 6, the force for maintaining the wheel, that is, the vehicle in the stop state can be small, and the actuator 73 for driving the rotation restricting mechanism 70 can also be reduced in size.

As illustrated in FIG. 3, the rotation restricting mechanism 70 of the embodiment is mechanically connected to the pinion gear 53 located at the uppermost position out of the plurality of pinion gears 53. With this configuration, the actuator 73 for driving the rotation restricting mechanism 70 can be disposed as high as possible to prevent intrusion of water into the actuator 73, particularly, intrusion of water into a connector part.

More specifically, the pinion gear 53 mechanically connected to the rotation restricting mechanism 70 includes the parking gear 53d between the large diameter gear 53a meshing with the first gear 51 and the small diameter gear 53b meshing with the second gear 52. The parking gear 53d of the embodiment is formed separately from the large diameter gear 53a, but may be formed integrally with the large diameter gear 53a. According to such a parking gear 53d, it is possible to dispose the rotation restricting mechanism 70 utilizing effectively the space of the outer periphery of the small diameter gear 53b. Further, the actuator 73 for driving the rotation restricting mechanism 70 is provided on the outer periphery of the differential gear casing 61 of the differential gear system 6, and thus the outer periphery of the differential gear casing 61 of the differential gear system 6 can be effectively utilized in the space. In FIG. 3, reference numeral 41c denotes an outer peripheral surface of the housing 4 which can suppress the protrusion of the rotation restricting mechanism 70 from the housing 4.

As described above, according to the embodiment, since the plurality of pinion gears 53 only rotate without revolving, it is possible to stop the operation of the entire power system 1 when the rotation restricting mechanism 70 is connected to only one of the pinion gears 53.

Further, since the rotation restricting mechanism 70 is mechanically connected to the pinion gear 53, as compared with the case where the rotation restricting mechanism 70 is connected to the differential gear casing 61 of the differential gear system 6 or the second gear 52, the force for maintaining the wheel, that is, the vehicle in the stop state can be small, and the actuator 73 or the like for driving the rotation restricting mechanism 70 can be reduced in size.

In addition, since the one pinion gear 53 out of the plurality of pinion gears 53 mechanically connected to the rotation restricting mechanism 70 is located at the uppermost position, it is possible to prevent intrusion of water into the actuator 73 for driving the rotation restricting mechanism 70, particularly, intrusion of water into the connector part even when the storage portion for storing lubricating oil is provided at the bottom of the housing 4.

Further, since the pinion gear 53 includes the large diameter gear 53a and the small diameter gear 53b and the small diameter gear 53b meshes with the second gear 52, enlargement in dimension in the radial direction can be prevented.

Further, since the parking gear 53d engaging with the rotation restricting mechanism 70 is provided on the large diameter gear 53a of one pinion gear 53, the outer periphery of the small diameter gear 53b can be effectively utilized in the space.

In addition, since the actuator 73 for driving the rotation restricting mechanism 70 is provided on the outer periphery of the differential gear casing 61 of the differential gear system 6, the outer periphery of the differential gear casing 61 of the differential gear system 6 can be effectively utilized in the space. When the rotation restricting mechanism 70 is disposed in the space of the outer periphery of the differential gear casing 61 of the differential gear system 6, for example, an electric oil pump can be disposed below the rotation restricting mechanism 70 in FIG. 3.

It is noted that the invention is not limited to the above-described embodiment, but can be appropriately modified and improved, for example.

For example, the number of pinion gears 53 is not limited to three, but may be one, two, or four or more.

The invention claimed is:

1. A power system comprising:
an electric motor;
a differential gear system that distributes output power of the electric motor to a left wheel and a right wheel of a vehicle; and
a transmission that is disposed on a power transmission path between the electric motor and the differential gear system,
wherein the transmission comprises
a first gear that is mechanically connected to the electric motor,
a second gear that has a rotation axis in common with the first gear and is mechanically connected to a differential gear casing of the differential gear system, and
a plurality of pinion gears that mesh with the first gear and the second gear;
wherein the plurality of pinion gears are supported to be capable of rotating and not to be capable of revolving;
wherein the plurality of pinion gears are disposed in a circumferential direction around the first gear,
wherein one pinion gear out of the plurality of pinion gears is only mechanically connected to a rotation restricting mechanism that is switchable between an operating state and a non-operating state; and
wherein the rotation restricting mechanism restricts rotation of the pinion gear in the operating state, and permits the rotation of the pinion gear in the non-operating state.

2. The power system according to claim 1, wherein the one pinion gear is located at an uppermost position out of the plurality of pinion gears.

3. The power system according to claim 1, wherein the one pinion gear comprises a large diameter gear and a small diameter gear, and the small diameter gear meshes with the second gear.

4. The power system according to claim 3, wherein the large diameter gear of the one pinion gear has a parking gear engaged with the rotation restricting mechanism.

5. The power system according to claim 1, wherein an actuator for driving the rotation restricting mechanism is provided on an outer periphery of the differential gear casing of the differential gear system.

* * * * *